United States Patent
Tsunoda et al.

(10) Patent No.: US 8,169,734 B2
(45) Date of Patent: May 1, 2012

(54) METHOD AND APPARATUS FOR CONTROLLING HEAD FLYING HEIGHT IN A DISK DRIVE

(75) Inventors: Masahiko Tsunoda, Hachioji (JP); Aya Tanaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/950,101

(22) Filed: Nov. 19, 2010

(65) Prior Publication Data

US 2011/0211276 A1     Sep. 1, 2011

(30) Foreign Application Priority Data

Feb. 26, 2010   (JP) ................................ 2010-042518

(51) Int. Cl.
*G11B 5/60*     (2006.01)
(52) U.S. Cl. .......................................................... 360/75
(58) Field of Classification Search .................... None
See application file for complete search history.

(56) References Cited

U.S. PATENT DOCUMENTS

| | | | |
|---|---|---|---|
| 6,587,301 B1 * | 7/2003 | Smith | 360/75 |
| 7,369,348 B2 * | 5/2008 | Strom et al. | 360/75 |
| 7,385,778 B2 * | 6/2008 | Kakiki | 360/75 |
| 7,483,234 B2 * | 1/2009 | Shimozato | 360/75 |
| 7,492,543 B2 * | 2/2009 | Mitsunaga et al. | 360/75 |
| 7,605,997 B2 | 10/2009 | Yamazaki | |
| 7,633,703 B2 * | 12/2009 | Ota | 360/75 |
| 7,706,098 B2 * | 4/2010 | Sato | 360/75 |
| 7,738,211 B2 | 6/2010 | Oyamada et al. | |
| 7,808,738 B2 * | 10/2010 | Mitsunaga et al. | 360/75 |
| 7,808,740 B2 * | 10/2010 | Tanabe | 360/75 |
| 7,817,372 B2 * | 10/2010 | Takahashi | 360/75 |
| 7,852,594 B2 * | 12/2010 | Maeda et al. | 360/75 |
| 7,933,085 B2 * | 4/2011 | Baumgart et al. | 360/75 |
| 2008/0130152 A1 * | 6/2008 | Kameyama | 360/31 |
| 2008/0186619 A1 | 8/2008 | Yamazaki | |
| 2009/0027800 A1 * | 1/2009 | Iwamoto et al. | 360/75 |
| 2009/0141390 A1 | 6/2009 | Oyamada et al. | |
| 2009/0141391 A1 * | 6/2009 | Kuramoto et al. | 360/75 |
| 2009/0213486 A1 * | 8/2009 | Takahashi | 360/75 |
| 2010/0073795 A1 * | 3/2010 | Amano | 360/75 |

FOREIGN PATENT DOCUMENTS

| | | |
|---|---|---|
| JP | 08-087731 | 4/1996 |
| JP | 2008-192244 | 8/2008 |
| JP | 2008-257851 | 10/2008 |
| JP | 2009-110614 | 5/2009 |
| JP | 2009-134834 | 6/2009 |

OTHER PUBLICATIONS

Notice of Reasons for Rejection mailed by the Japan Patent Office on May 24, 2011 in corresponding Japanese app. No. 2010-042518 in 5 pages.

* cited by examiner

*Primary Examiner* — Will J Klimowicz
*Assistant Examiner* — James L Habermehl
(74) *Attorney, Agent, or Firm* — Knobbe, Martens, Olson & Bear, LLP (57) ABSTRACT

According to one embodiment, a disk drive includes a measuring module, a flying height controller, a detection module, and a controller. The measuring module is configured to measure the flying height that the head has with respect to the disk. The flying height controller is configured to control the head flying height in accordance with a value preset for the head flying height. The detection module is configured to detect the values representing the environmental elements of the head. The controller is configured to adjust the preset value in accordance with the flying height measured by the measuring module and values detected by the detection module if environmental changes are detected from the environmental element values output from the detection module.

8 Claims, 6 Drawing Sheets

METHOD AND APPARATUS FOR CONTROLLING HEAD FLYING HEIGHT IN A DISK DRIVE

CROSS-REFERENCE TO RELATED APPLICATIONS

This application is based upon and claims the benefit of priority from Japanese Patent Application No. 2010-042518, filed Feb. 26, 2010; the entire contents of which are incorporated herein by reference.

FIELD

Embodiments described herein relate generally to a technique of controlling head flying height, for use in disk drives.

BACKGROUND

In most disk drives, a representative example of which is the hard disk drive, a head reads or writes data on or from a disk used as a recording medium, while it is flying above the disk. The flying height of the head influences the data recording and reproducing characteristic of the disk drive, and should therefore be set to an optimal value.

In order to set the flying height of the head to an optimal value, a technique may be used which first measures the head flying height and then adjusts the head flying height in accordance with the value measured. A method of adjusting the head flying height is known, which heats the slider holding the read/write element of the head, thereby controlling the flying height. On the other hand, a method of measuring the flying height is known, which reads data from the disk and uses the harmonic component contained in the data, thereby measuring the flying height of the head (see, for example, Jpn. Pat. Appln. KOKAI Publication No. 2008-192244).

The method that utilizes the harmonic component can dynamically measure the head flying height. If this measuring method is used in combination with the method of heating the slider, the head flying height can be dynamically set to an optimal value. The head flying height may change due to, for example, the ambient temperature of the head. In any common hard disk drive, the heating of the slider is controlled by changing the amount of heat to be applied to the slider from the value that has been set, during the manufacture of the disk drive, in accordance with various use conditions (including the ambient temperature of the head).

However, the disk drive manufactured in and shipped from the factory may be used in conditions that differ from those considered during the manufacture. Consequently, the head will possibly fail, in some cases, to have a flying height optimal to the conditions in which the hard disk is actually used, even if the preset amount of heat is applied to the slider.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a disk drive includes a measuring module, a flying height controller, a detection module, and a controller. The measuring module is configured to measure the flying height that the head has with respect to the disk. The flying height controller is configured to control the head flying height in accordance with a value preset for the head flying height. The detection module is configured to detect the values representing the environmental elements of the head. The controller is configured to adjust the preset value in accordance with the flying height measured by the measuring module and values detected by the detection module if environmental changes are detected from the environmental element values output from the detection module.

That is, the disk drive according to the embodiment utilizes harmonic sensing control (hereinafter referred to as "HSC," as needed), thereby achieving dynamic measuring of head flying height. Thus, the disk drive dynamically controls the flying height in accordance with the environmental changes including the change in the ambient temperature.

[Configuration of the Disk Drive]

Figure 1:
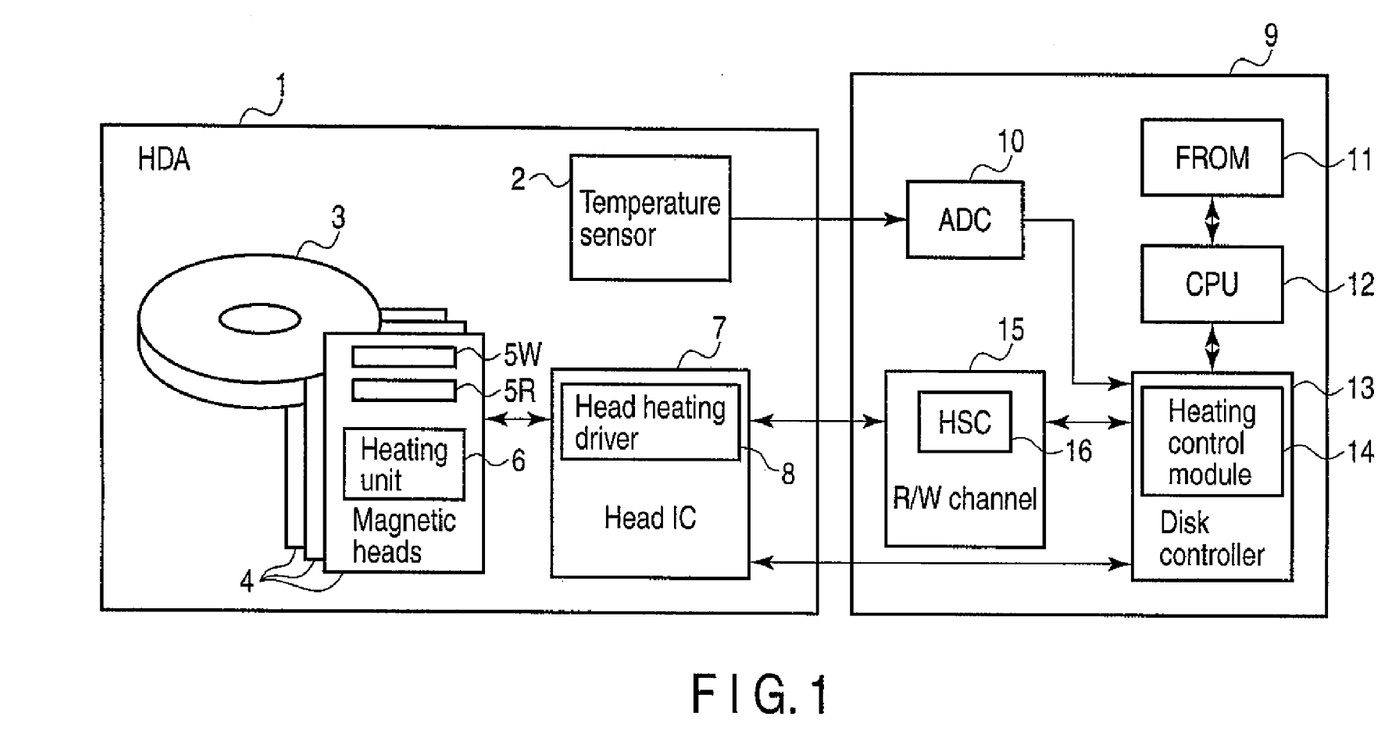
FIG. 1 is a block diagram explaining the configuration of a disk drive according to an embodiment.

FIG. 1 is a block diagram showing the major components of a disk drive according to this embodiment.

As FIG. 1 shows, the disk drive has a head-disk assembly (HDA) 1 and a circuit board 9. The HDA 1 has a temperature sensor 2, a plurality of disks 3 used as magnetic recording media, a plurality of magnetic heads 4 (hereinafter called "heads"), and a head amplifier IC circuit 7 (hereinafter called "head IC"). The temperature sensor 2 detects the temperature in the HDA1 after the power switch of the disk drive has been closed, and generates a detection signal representing the temperature detected. The detection signal is transmitted to the circuit board 9.

The disks 3 are rotated by a spindle motor. Each disk 3 has recording surfaces. The heads 4 are mounted on actuators, respectively, and arranged, each opposed to one recording surface of a disk 3. Each head 4 has a read head element 5R and a write head element 5W, both mounted on the slider. The read head element 5R reads data from the disk 3. The write head element 5W writes data on the disk 3. The head 4 is moved to a designated position over the disk 3 as the actuator is driven.

Each head 4 has a heating unit 6, which is mounted on the slider. The heating unit 6 is constituted by, for example, a heater (coil) and heats the slider in accordance with a current supplied to it from a head heating driver 8. As the slider is so heated, its distal end facing the recording surface of the disk 3 expands. As a result, the flying height of the head relatively decreases. The heat applied from the heating unit 6 may decrease. In this case, the distal end of the slider shrinks, relatively increasing the flying height of the head.

The head heating driver 8 is mounted on the head IC 7 and supplies a heating current to the heating unit 6. The heating current is controlled by a heating control module 14, which will be described later. The head IC 7 has a read amplifier and a write driver, in addition to the head heating driver 8. The read amplifier amplifies a read signal read by the read head element 5R. The read signal, thus amplified, is transmitted to a read/write (R/W) channel 15. On the other hand, the write driver transmits to the write head 5W a write current according to write data output from the read/write (R/W) channel 15.

The circuit board 9 has an analog-to-digital (A/D) converter 10, a flash memory 11 (i.e., FROM), a microprocessor (CPU) 12, a disk controller 13, and an R/W channel 15.

The A/D converter 10 receives a detection signal from the temperature sensor 2 and converts the same to temperature data. The temperature data is transmitted to the heating control module 14 that is incorporated in the disk controller 13. The disk controller 13 performs an interface control, controlling the transfer of data between the R/W channel 15a and a host system (not shown). Further, the disk controller 13 receives a heating control signal output from the heating control module 14 and transmits the heating control signal to the head heating driver 8 incorporated in the head IC 7.

The CPU 12 is the main controller in the disk drive, performing servo control and data read/write control. The CPU 12 is a flying height controller that cooperates with the heating control module 14 to control the flying height of each head 4. The flash memory 11 stores table data representing the various values the ambient temperature may have and the various heat amounts associated with the temperature values, which the heating unit 6 should apply to each slider.

The R/W channel 15 includes a read channel and a write channel. The read channel processes read data signals. The write channel processes write data signals. The R/W channel 15 further has a harmonic sensing control (HSC) circuit 16 (hereinafter referred to as "HSC circuit." The HSC circuit 16 is a measuring module that measures the flying height of each head 4 from the harmonic component of the HSC pattern recorded on the disk 3, as will be explained hereinafter.

[Control of the Head Flying Height]

How the flying height of each head is controlled in this embodiment will be explained with reference to FIG. 2A to FIG. 9.

How the HSC circuit 16 measures the flying height of the head 4 will be explained at first. In this embodiment, the HSC circuit 16 calculates the flying height of the head 4 from the harmonic component of the HSC pattern.

Figure 2A:
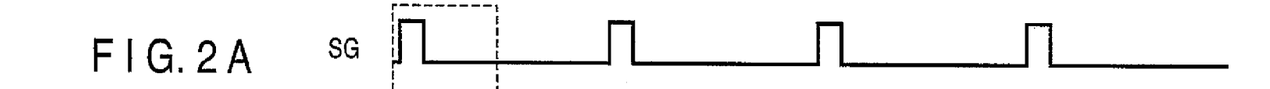
FIGS. 2A, 2B and 2C are diagrams explaining the state in which an HSC pattern is recorded in the embodiment.
Figure 2B:
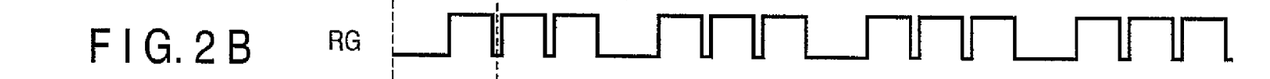
Figure 2C:
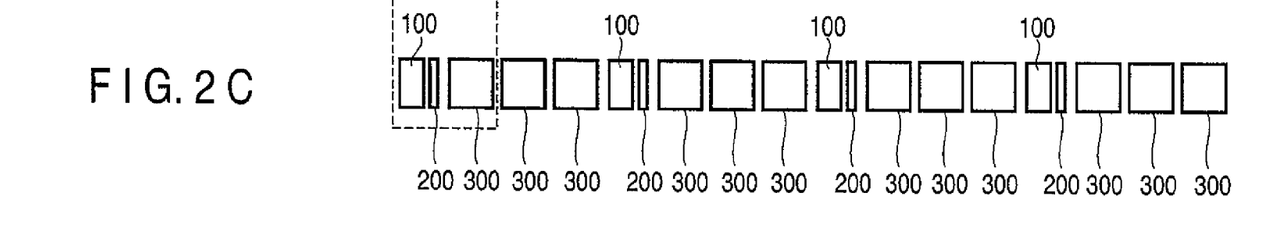

As shown in FIG. 2C, the HSC pattern 200 is recorded as flying height measuring data of about one-symbol length, immediately after each servo sector (SV) 100 provided on the disk 3. The servo sector 100 is an area in which servo data is held, which the CPU 12 uses to perform servo control. The HSC pattern 200 is followed by a data sector (DATA) 300, i.e., an area in which user data may be recorded.

The read channel of the R/W channel 15 extracts servo data and user data from a read signal that has been output from the read head element 5R of the head 4. More precisely, the read channel first extracts the servo data from the servo sector 100 at the timing of a servo gate SG of FIG. 2A, and then extracts the user data from the data sector 300 at the timing of a read gate RG of FIG. 2B.

Figure 3A:
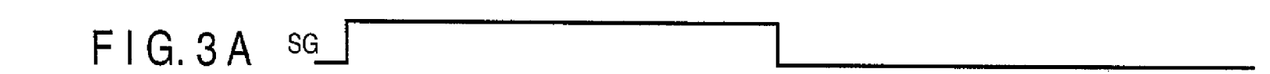
FIGS. 3A, 3B, 3C, 3D and 3E are a timing chart explaining how an HSC pattern is reproduced in the embodiment.
Figure 3B:
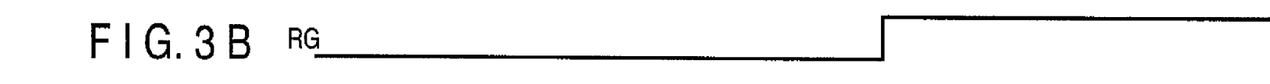
Figure 3C:
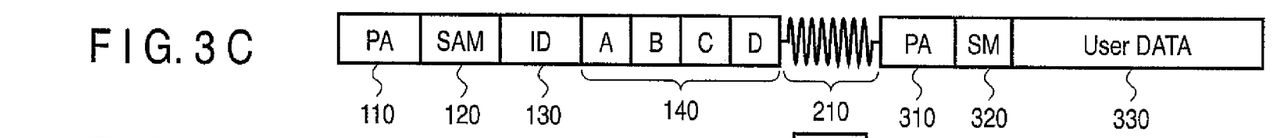

As FIG. 3C shows, the servo sector 100 includes a preamble (PA) area 110, a servo mark (SAM) area 120, an address (ID) area 130, and a servo burst signal (position error data items A to D) area 140. A track address and a sector address are recorded in the address area 130. As shown in FIG. 3C, the data sector 300 includes a preamble (PA) area 310, a sync mark (SM) area 320, and a user data recording area 330.

Figure 3D:
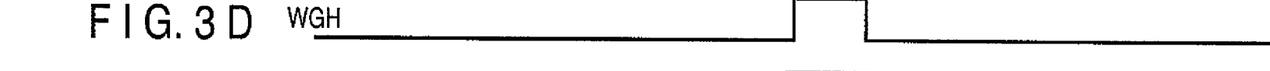
Figure 3E:
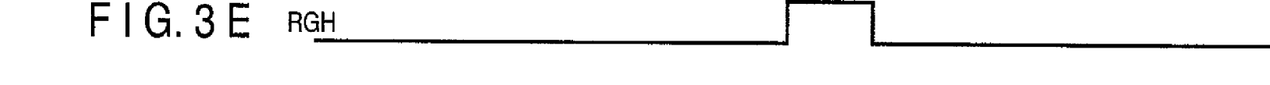

The write channel of the R/W channel 15 causes the write head element 5W of the head 4 to record an HSC pattern 200 of about one-symbol length, immediately after the servo sector 100 at the timing of an HSC write gate WGH, as shown in FIG. 3D. Meanwhile, the HSC circuit 16 extracts the HSC pattern 200 from the read signal output from the read head element 5R, at the timing of an HSC read gate RGH, as shown in FIG. 3E.

Figure 4:
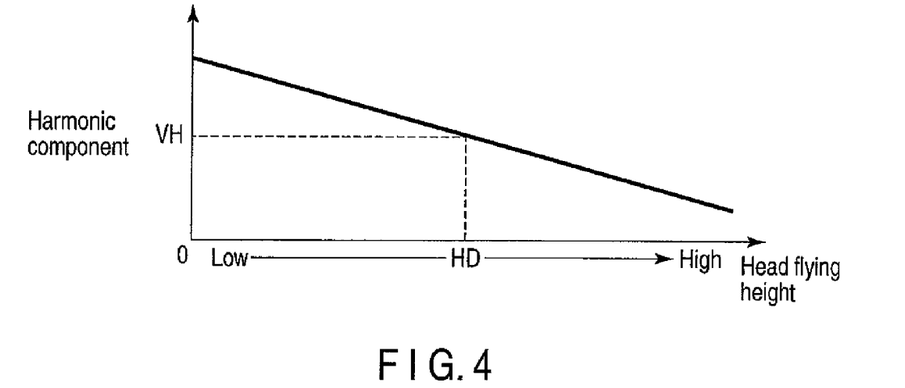
FIG. 4 is a diagram explaining the relationship the flying height and the harmonic component have in the embodiment.

FIG. 4 is a diagram explaining the relationship that the harmonic component of the HSC pattern has with the head flying height. The HSC circuit 16 of this embodiment calculates the head flying height (HD) corresponding to the harmonic component of the HSC pattern 200, on the basis of the relation shown in FIG. 4. As seen from FIG. 4, the smaller the harmonic component, the greater the head flying height will be, and the larger the harmonic component, the smaller the head flying height will be.

A method of measuring the head flying height will be explained with reference to the flowchart of FIG. 6.

In this embodiment, the CPU 12 selects one of the heads 4 in accordance with the address on the disk 3 which should be accessed. That is, the CPU 12 switches the head to another as the address to access is changed to another. At this point, the CPU 12 starts measuring operation of the flying height of the head 4 using the HSC circuit 16.

To be more specific, the heating control module 14 refers to the table data stored in the flash memory 11, setting the heat amount data representing a standard value, to the head heating driver 8. The head heating driver 8 supplies a heating current that accords with the heat amount data set, to the heating unit 6 of the head 4 selected (Block 600). The slider holding the head 4 selected is therefore heated, and read head element 5R of the head 4 reads the HSC pattern 200 recorded on the disk 3.

The HSC circuit 16 calculates the flying height of the head 4 from the harmonic component of the HSC pattern 200 that has been processed, in the form of a signal, by the read channel of the R/W channel 15 (Block 603). More precisely, the HSC circuit 16 first sets the number (n) of HSC patterns 200 to be sampled and then calculates the flying height from the nth HSC pattern 200 (initial value being 0th HSC pattern) (Blocks 601 to 603). Next, the HSC circuit 16 calculates an average flying height (Hc) from the harmonic components of n samples (nsat) (Blocks 604 and 605).

In this embodiment, the HSC circuit 16 reads the HSC pattern 200 of about one-symbol length, which is recorded immediately after each servo sector 100 as shown in FIG. 2C, thereby measuring the flying height of the head 4. Unlike in the case where one HSC pattern has a sampling number equivalent to the length of one data sector, only one or less sample is acquired from the HSC patterns 200 in this embodiment is 1/400 or less for one HSC pattern. Consequently, the precision of the head flying height calculated from the harmonic component acquired from each HSC pattern 200 will be relatively low.

Figure 6:
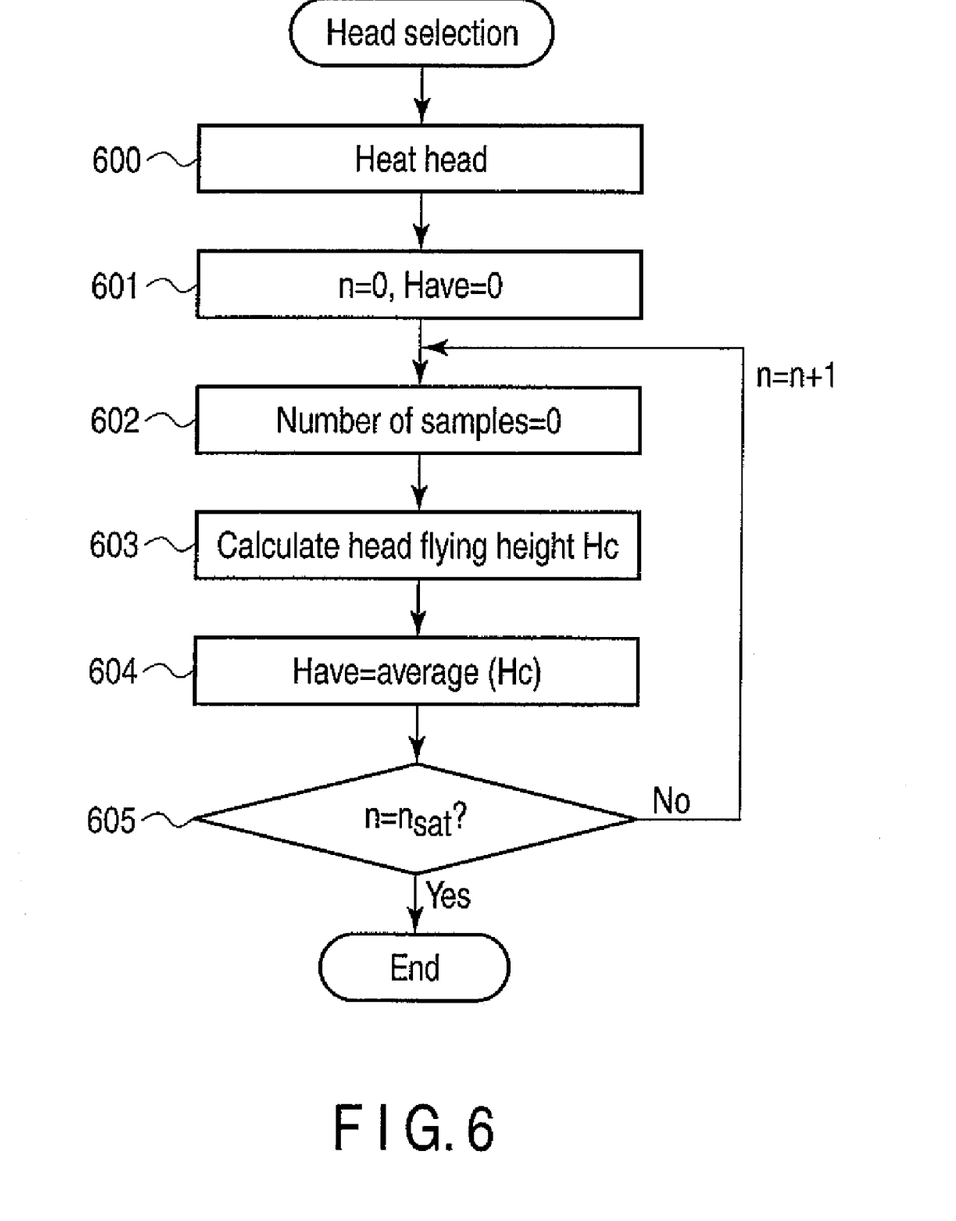
FIG. 6 is a flowchart explaining a method of measuring a flying height in the embodiment.

In view of this, the HSC circuit 16 finds an average of the flying heights calculated from the harmonic components read from a plurality of HSC patterns 200, respectively, as shown in the flowchart of FIG. 6, in this embodiment. The head flying height is thereby measured with relatively high precision. In this case, the number (nsat) of samples means the number of sampled HSC patterns 200 which is large enough to calculate the flying height with a sufficiently high precision. In this embodiment, the HSC patterns 200 are arranged at equal intervals in each track of the disk 3. The area occupied by all HSC patterns in each track can be set shorter than a one-sector length. Hence, the efficiency of formatting the disk 3 would not decrease.

Figure 5:
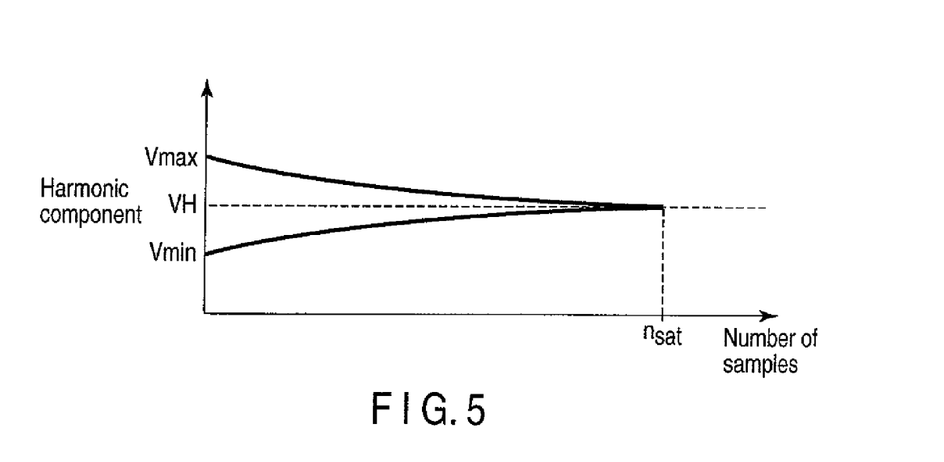
FIG. 5 is a diagram explaining the relationship the HSC pattern and the harmonic component have in the embodiment.

FIG. 5 is a diagram explaining the relation between the number of relationship the HSC patterns sampled and the average value of the harmonic components obtained from an HSC pattern. In FIG. 5, Vmax is the maximum average value of the harmonic components, and Vmin is the minimum average value of the harmonic components. The harmonic component read from each HSC pattern differs from the desirable harmonic component VH. Therefore, the HSC patterns 200 for a sufficient number (nsat) of samples are acquired, thereby obtaining a desirable high harmonic component VH. This helps to measure the head flying height with high precision.

How the heating of the head is controlled to control the head flying height in this embodiment will be explained, with reference to the flowchart of FIG. 7. The head flying height is measured by the method shown in the flowchart of FIG. 6.

Assume that in this embodiment, one (head A) of the heads 4 which is selected as the address to access is changed to another (Block 700), the head thus selected is then switched to another (head B) (Block 705), and the head A is selected again (Block 709).

One of the environmental elements of the head (i.e., ambient temperature, in this instance) which has been selected may change when the head is switched to another. The environmental element E1 may change from the value it had when the first head A was selected, to element E2 when the next head B is selected. Further, the environmental element E2 may change to element E3 when the third head C is selected. These environmental elements E1 to E3 are, respectively, the ambient temperatures the temperature sensor 2 detects for the three heads selected one after another. The differences between environmental elements E1 to E3 are changes in the environment (i.e., change in ambient temperature).

After the power switch of the disk drive is closed, the CPU 12 selects the head A (Block 700). Then, the heating control module 14 refers to the table data stored in the flash memory 11, setting the heat amount data CA optimized during the manufacture of the disk drive to the head heating driver 8 (Block 701). The head heating driver 8 supplies a heating current that accords with the heat amount data CA, to the heating unit 6 of the head A selected.

The HSC circuit 16 calculates the flying height (i.e., average value) from the harmonic component of the HSC pattern 200 read by the read head element 5R of the head A (Block 702). The flying height of the head A, so detected, may be influenced by the environmental element E1 existing at present. In other words, this flying height may differ from the flying height optimized for the head A during the manufacture of the disk drive, because of the ambient temperature detected at present by the temperature sensor 2.

This is why the heating control module 14 again refers to the table data stored in the flash memory 11, and calculates heat amount data CAa so that the head A may have an optimal flying height associated with the temperature detected by the temperature sensor 2 (Block 703). The head heating driver 8 supplies a heating current that accords with the heat amount data (CAa), to the heating unit 6 of the head A (Block 704). The head A selected therefore has a flying height optimal to the environmental element E1, and reads or writes data from or on the disk 3.

Next, the head B is selected, that is, the head is switched from the head A to the head B (Block 705). The heating control module 14 refers to the table data stored in the flash memory 11, setting heat amount data CB optimized during the manufacture of the disk drive to the head heating driver 8 (Block 706). The head heating driver 8 supplies a heating current that accords with the heat amount data (CB).

The HSC circuit 16 calculates the flying height (i.e., average value) for the head B from the harmonic component of the HSC pattern 200 read by the read head element 5R of the head B (Block 707). The flying height of the head B, so detected, may be influenced by the environmental element E2 existing at present. In other words, this flying height may differ from the flying height optimized for the head B during the manufacture of the disk drive, because of the ambient temperature detected at present by the temperature sensor 2.

Then, the heating control module 14 refers to the table data stored in the flash memory 11, calculating heat amount data CBb so that the head B may have an optimal flying height associated with the temperature detected by the temperature sensor 2 (Block 708). The head heating driver 8 supplies a heating current that accords with the heat amount data (CBb), to the heating unit 6 of the head A (Block 709). The head B selected therefore has a flying height optimal to the environmental element E2, and reads or writes data from or on the disk 3.

Assume that the head A is selected again or the head is switched from the head B back to the head A. Then, the CPU 12 refers to the time elapsed between the moment the head A was selected for the first time and the moment the head A is selected again (Blocks 710 and 711). The time elapsed may be so short that the environmental element E1 existing when the head A was selected for the first time would not change at all (YES in Block 711). If this is the case, the CPU 12 applies the flying height optimal to the environmental element E1 (Block 713). That is, the heating control module 14 sets heat amount data CAa to the head heating driver 8. The head heating driver 8 therefore supplies a heating current that accords with the heat amount data (CAa) to the heating unit 6 of the head A.

The time elapsed may be so long that the environmental element E1 existing when the head A was selected for the first time may change at all (NO in Block 711). In this case, the CPU 12 controls the head flying height as will be explained below.

First, the CPU 12 acquires, from the temperature sensor 2, the data about the environmental element E3 existing when the head A was selected again (i.e., ambient temperature of the head A). The CPU 12 then compares the data about environmental element E1 with the data about environmental element E3, determining whether the change in environmental element is equal to or smaller than a threshold value (Block 712). The "change in environmental element" is the difference between the ambient temperature the head A had when selected previously and the ambient temperature the head A had when selected again.

If the change in environmental element is equal to or smaller than the threshold value (YES in Block 712), the CPU 12 determines that the environment of the head A has not changed so much to influence the flying height of the head A. In this case, the CPU 12 applies the flying height optimal to the environmental element E1 (Block 713). The heating control module 14 therefore sets the heat amount data CAa to the head heating driver 8. The head heating driver 8 supplies a heating current that accords with the heat amount data CAa to the heating unit 6 of the head A.

If the change in environmental element exceeds the threshold value (NO in Block 712), the CPU 12 determines that the environment of the head A has changed to a large enough extent that it influences the flying height of the head A. In this case, the CPU 12 instructs the heating control module 14 to set the heat amount data CA optimized during the manufacture of the disk drive, to the head heating driver 8 (Block 714). The head heating driver 8 supplies a heating current that accords with the heat amount data (CA), to the heating unit 6 of the head A.

The HSC circuit 16 calculates the flying height (i.e., average value) for the head A from the harmonic component of the HSC pattern 200 read by the read head element 5R of the head A (Block 715). The heating control module 14 refers to the table data stored in the flash memory 11, calculating heat amount data CBab so that the head A may have an optimal flying height associated with the temperature detected by the temperature sensor 2 (Block 716). The head heating driver 8 supplies a heating current that accords with the heat amount data (CBab), to the heating unit 6 of the head A (Block 717). The head A selected again therefore has a flying height optimal to the environmental element E3, and reads or writes data from or on the disk 3.

In the head flying height control according to this embodiment, a flying height optimal in view of the change in the environment can be applied to any head 4 when the head 4 is selected. In other words, the flying height of each head 4 can be dynamically controlled in accordance with changes in the environment of the head 4. In the embodiment described above, the environmental element for each head is the ambient temperature the temperature sensor 2 detects. Nonetheless, the environmental element may be the pressure or humidity in the head-disk assembly (HAD) 1. In this case, the head-disk assembly (HAD) 1 may incorporate a sensor for detecting the pressure or humidity, and the flash memory 11 may store table data that represents the various values the pressure or humidity may have and the various heat amounts associated with the pressure or humidity values, which the heating unit 6 should apply to each slider.

Figure 8:
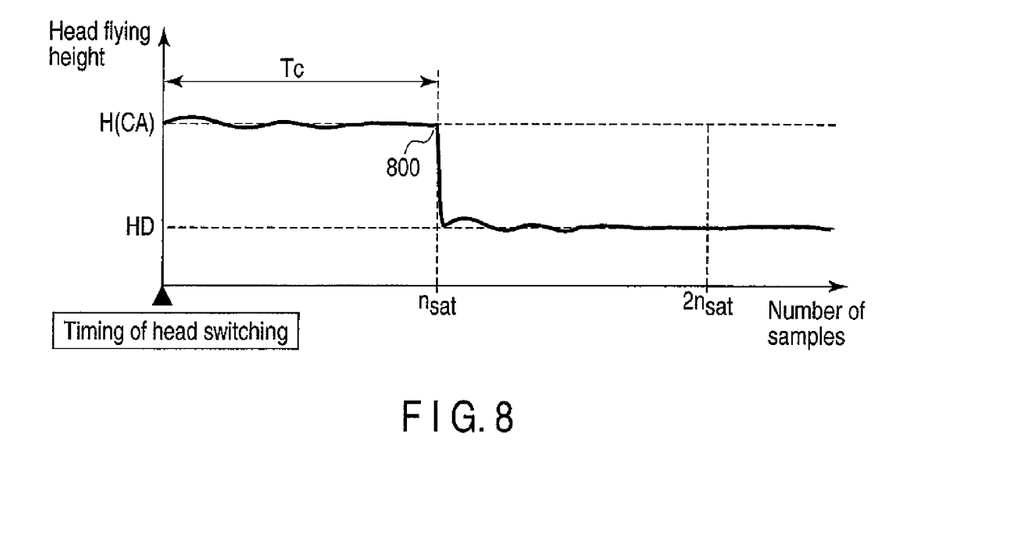
FIG. 8 is a diagram explaining a transition of the average flying height, which is observed in the embodiment.
Figure 9:
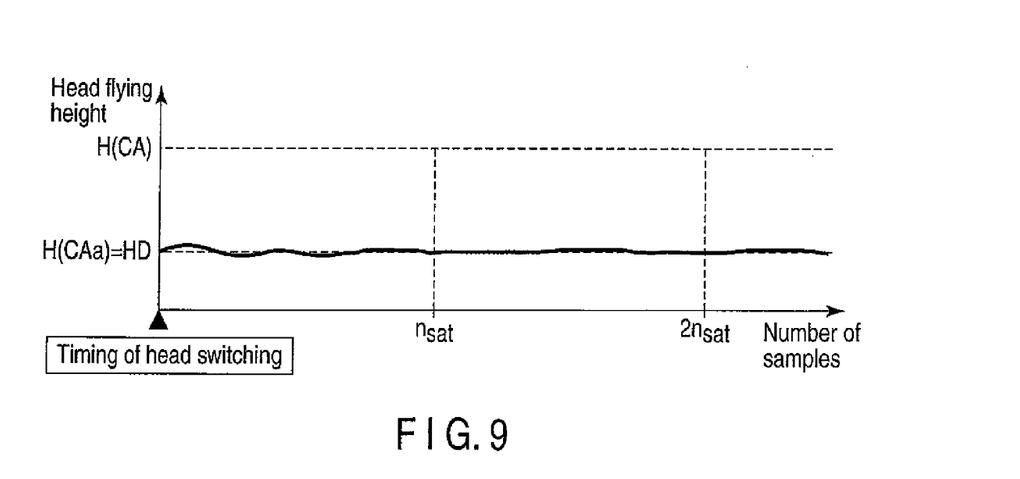
FIG. 9 is a diagram explaining another transition of the average flying height, which is observed in the embodiment.

FIG. 8 and FIG. 9 are diagrams, each explaining a transition of the average head flying height measured in the present embodiment. In FIG. 8, Tc is the period for which the harmonic component is calculated, and "800" is the time when the heating current is supplied to the heating unit 6 of the head 4 to give the head 4 a desired flying height.

That is, FIG. 8 is a diagram showing how the average flying height changes when the head A is selected for the first time, when the head B is changed, and when the environmental element changes from element E1 to element E3 by a value exceeding the threshold value as the head A is selected again. (See the case where the decision is NO in Block 712.)

Figure 7:
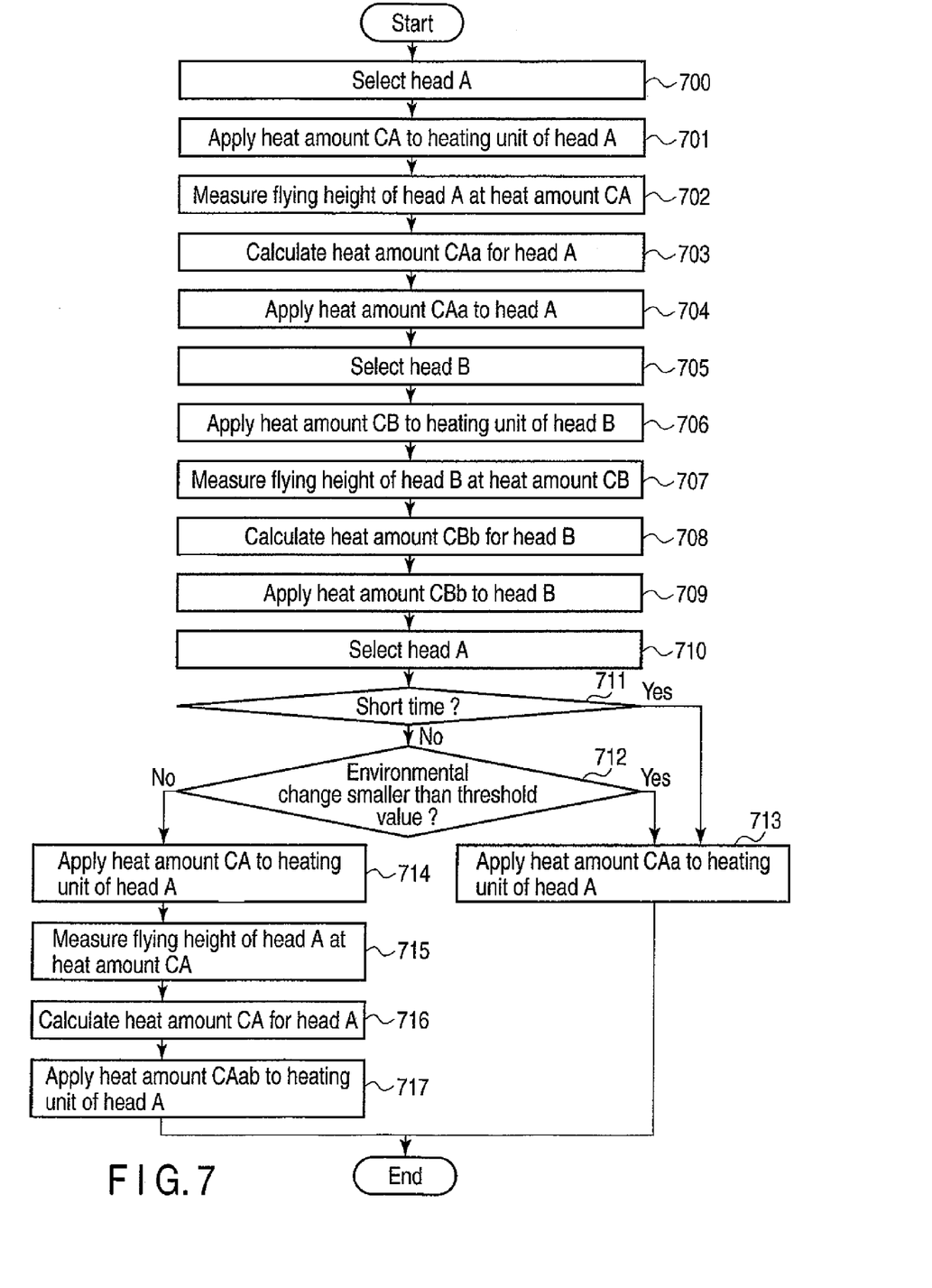
FIG. 7 is a flowchart explaining a method of controlling the heating of the head in the embodiment.

FIG. 9 is a diagram showing how the average flying height changes when the head A is selected again upon the elapse of a short time after it has been selected for the first time or when the environmental element changes by a value which was equal to or smaller than the threshold value, while the heating of the head is controlled as shown in FIG. 7.

As seen from FIG. 8, the heat amount data CA optimized during the manufacture of the disk drive is supplied to the heating unit 6 of the head 4 immediately after the timing of switching of the head. During the period Tc of reading an HSC pattern large enough to measure the flying height, the head flying height is calculated from the harmonic component of the HSC pattern in the above-described method of measuring the flying height. The heating control module 14 calculates the heat amount (CAa) required to give the head the optimal flying height, from the flying height measured at the heat amount CA. The flying height of the head 4 is thereby optimized.

As can be understood from FIG. 9, the heat amount (CAa) is applied immediately after the head-switching timing, in order to achieve a flying height optimal for the environmental element E1 existing at the previous selection of the head A. If the change from the environmental element scarcely changes from element E1 to element E3, the heat amount (CAa) calculated for the environmental element E1 is equal to the heat amount required to achieve the optimal flying height for the environmental element E3 existing when the head A is selected again. Hence, as shown in FIG. 9, the desirable head flying height (HD) can be achieved immediately after the head-switching timing.

As has been described, the head flying height is dynamically measured in this embodiment. That is, HSC patterns 200 having a relatively short data length are arranged at intervals, and the flying height of the selected head 4 is calculated from the harmonic components acquired from these HSC patterns. The flying height of the head 4 can therefore be measured with relatively high precision.

The same head may be selected again at the head-switching timing upon the elapse of a time too short for an environmental change or at an environmental change equal to or smaller than a threshold value. In this case, the flying height optimized at the previous head selection will be applied. The head can therefore have an optimal flying height immediately after it has been selected. In other words, the time the head needs to acquire the optimal flying height can be shortened.

The same head may also be selected again immediately after it has been selected for the first time. If the environmental element has changed by a value exceeding the threshold value, the flying height is measured and the heat amount to apply to the head can be optimized in accordance with the flying height measured. This suppresses the influence the environmental change imposes on the head flying height, preventing the head from falling onto the disk 3. An optimal control of the head flying height can thereby be accomplished in accordance with the changes in the environment of the head.

Moreover, less HSC patterns should be acquired than otherwise immediately after the head-switching timing in order to optimize the head flying height. This helps to shorten the time required to optimize the head flying height after the head has been switched to another.

The various modules of the systems described herein can be implemented as software applications, hardware and/or software modules, or components on one or more computers, such as servers. While the various modules are illustrated separately, they may share some or all of the same underlying logic or code. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk drive comprising:
 a measuring module configured to measure a flying height of a head with respect to a disk;
 a flying height controller configured to control the flying height based on a preset value corresponding to the flying height;
 a detection module configured to detect an environmental element value representing an environment of the head; and a controller configured to maintain or adjust the preset value in accordance with changes in the environment based on the environmental element value detected by the detection module, the controller being further configured to:

maintain the preset value set before head switching, when the same head is selected again in an occurrence of the head switching, and subject to a first condition that the same head is selected again within a short time from last selection of the same head or a second condition that a change in the ambient environment is not more than a threshold value, and adjust the preset value of the head selected again, based on the flying height measured by the measuring module and the environmental element value detected by the detection module, if neither the first condition nor the second is met.

2. The disk drive of claim 1, wherein when the preset value is adjusted, the controller is configured to:

acquire data representing the flying height measured by the measuring module;

refer to table information prepared beforehand and calculate a setting value of an optimal flying height corresponding to the environmental element value by the detection module; and cause the flying height controller to control the measured flying height to be the optimal flying height based on the setting value.

3. The disk drive of claim 1, wherein the detection module includes an environment sensor configured to detect the environmental element value, the environment sensor including at least a sensor selected from the group of sensors comprising a temperature sensor configured to detect an ambient temperature of the head, a pressure sensor configured to detect an ambient pressure of the head, and a humidity sensor configured to detect an ambient humidity of the head.

4. The disk drive of claim 1, wherein the flying height controller comprises a heating control module configured to control the heating of the head in accordance with a heat amount set as the preset value, in order to control the flying height of the head.

5. The disk drive of claim 1, wherein the measuring module is configured to read harmonic sensor patterns arranged at a plurality of positions on the disk and to calculate the flying height from harmonic components extracted from the harmonic sensor patterns.

6. The disk drive of claim 1, wherein the measuring module is configured to read harmonic sensor patterns arranged immediately after servo sectors provided on the disk and to calculate the flying height from harmonic components extracted from the harmonic sensor patterns.

7. A method of controlling the flying height of a head, for use in a disk drive including a measuring module configured to measure a flying height of a head with respect to a disk, and a flying height controller configured to control the flying height based on a preset value corresponding to the flying height, the method comprising:

detecting an environmental element value representing an environment of the head;

detecting a change in the environment of the head from the environmental element value; and performing a control process of maintaining or adjusting the preset value based on the change in the environment, the control process comprising:

maintaining the preset value set before head switching, when the same head is selected again in an occurrence of the head switching, and subject to a first condition that the same head is selected again within a short time from last selection of the same head or a second condition that a change in the environment is not more than a threshold value; and adjusting the preset value of the head selected again, based on the flying height measured by the measuring module and the environmental element value detected by the detection module, if neither the first condition nor the second is met.

8. The method of claim 7, wherein when the preset value is adjusted, the control process executes:

acquiring data representing the flying height measured by the measuring module;

referring to table information prepared beforehand and calculating a setting value of an optimal flying height corresponding to the environmental element value detected by the detection module; and causing the flying height controller to control the measured flying height to be the optimal flying height based on the setting value.

* * * * *